July 5, 1938.  P. V. HUNTER ET AL  2,122,911
STRANDED MEMBER FORMED OF WIRE OR METAL STRIP, PARTICULARLY
APPLICABLE TO ELECTRIC CONDUCTORS
Filed June 3, 1937  3 Sheets-Sheet 1

INVENTOR
PHILIP VASSAR HUNTER
and HARRY HILL
BY
ATTORNEYS

July 5, 1938.  P. V. HUNTER ET AL  2,122,911
STRANDED MEMBER FORMED OF WIRE OR METAL STRIP, PARTICULARLY
APPLICABLE TO ELECTRIC CONDUCTORS
Filed June 3, 1937   3 Sheets-Sheet 2
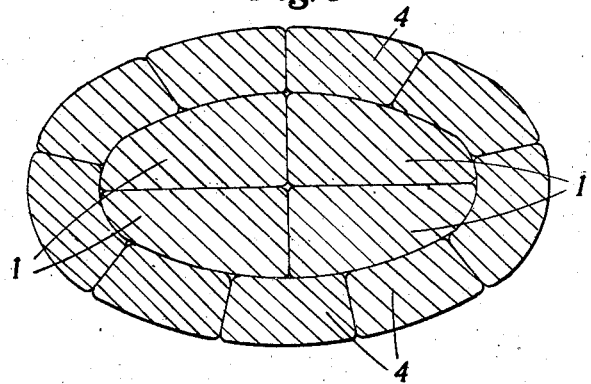
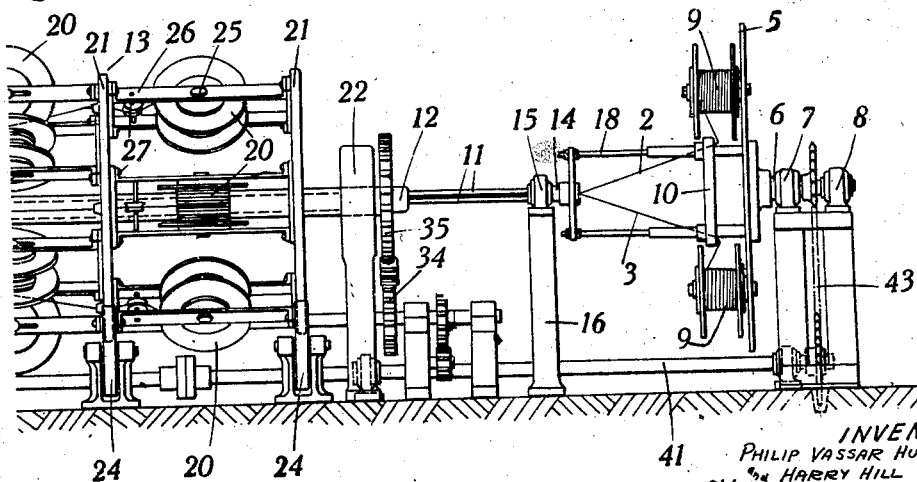
INVENTORS
PHILIP VASSAR HUNTER
and HARRY HILL
BY
ATTORNEYS July 5, 1938.  P. V. HUNTER ET AL  2,122,911
STRANDED MEMBER FORMED OF WIRE OR METAL STRIP, PARTICULARLY
APPLICABLE TO ELECTRIC CONDUCTORS
Filed June 3, 1937   3 Sheets-Sheet 3
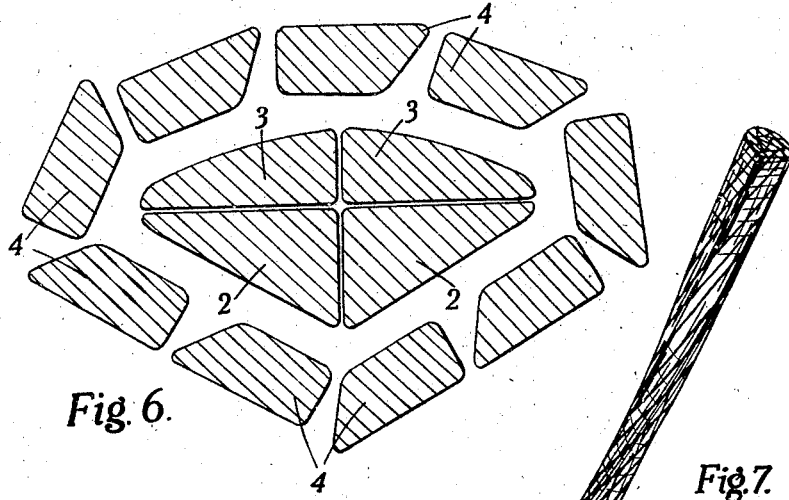
Fig. 6.
Fig. 7.
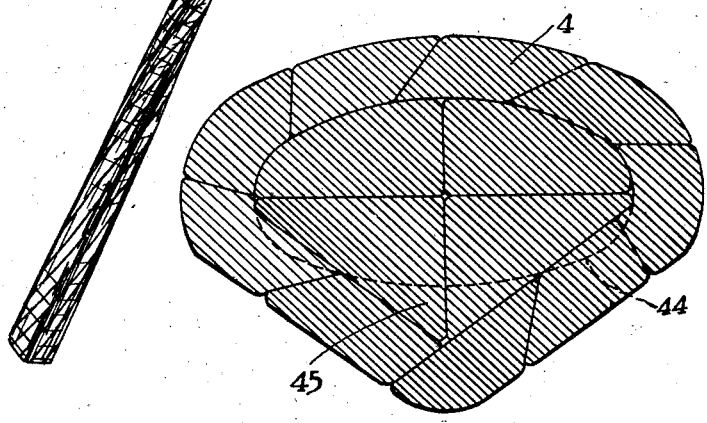
Fig. 8.
INVENTORS
PHILIP VASSAR HUNTER
BY HARRY HILL
ATTORNEYS Patented July 5, 1938

2,122,911

UNITED STATES PATENT OFFICE 2,122,911

STRANDED MEMBER FORMED OF WIRE OR METAL STRIP, PARTICULARLY APPLICABLE TO ELECTRIC CONDUCTORS

Philip Vassar Hunter, London, and Harry Hill, Belvedere, Kent, England, assignors to Callender's Cable and Construction Company, Limited, London, England, a British company Application June 3, 1937, Serial No. 146,246 In Great Britain June 17, 1936

3 Claims. (Cl. 117—20)

This invention deals with the form and construction of stranded members, particularly for the conductors of multicore electric cables of the non-circular, pre-spiralled type. The term "pre-spiralled" is understood to indicate that, in the process of manufacture of each of the conductors before the application of insulating material, the conductor is formed so as to have a twisted appearance, being of the same section at all points, but having this section progressively rotated about its axis as it travels along the conductor. This formation of the conductors (which are subsequently to be insulated and then assembled in a cable by being laid up together) has the effect of facilitating the laying up which can be done with very little, if any, distortion of the conductor from the pre-spiralled form. For this, it is necessary that the lay of the cores when assembled together should be equal to the length of conductor in which the section makes a complete rotation about its axis. This is often referred to as the pre-spiralled lay.

In accordance with this invention, such a stranded member is formed of two parts, a central part and an outer part. The central part is formed of wire or metal strip having a smoothly curved sectional outline corresponding with the non-circular shape to be given to the finished member, and this part is given the pre-spiralled lay. The outer part of the member is formed of one or more layers of wires which are all initially of similar sectional shape, which is not circular but is in the form of a four-sided figure approximating in shape to the average shape of the assembled wires. These wires are applied to the central part by a stranding operation carried out with a lay which is much shorter than the pre-spiralled lay. The layer or layers forming the outer part is preferably rolled or otherwise compressed or drawn down so as to press the wires of the outer part close together and close to the central part deforming the wires to the comparatively small extent necessary to change them from their original form to a form in which they fit closely together.

The invention is further described hereinafter with reference, by way of example, to the accompanying drawings, wherein:—

Figure 3 represents a transverse section through a pre-spiralled oval conductor formed in accordance with the invention;

Figure 4 represents the original sectional shape of wires used to form the outer part of the conductor shown in Figure 3;

Figure 1:
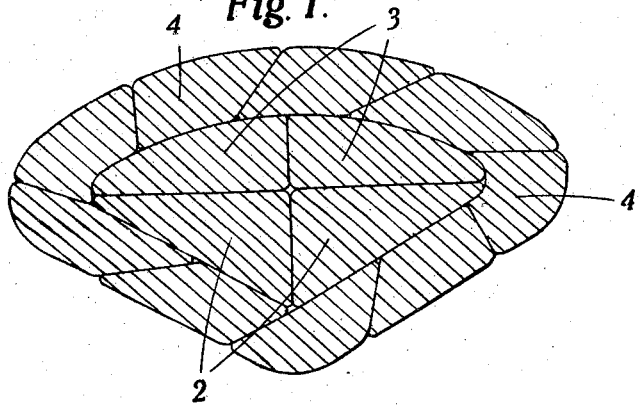
Figure 1 represents a transverse section through a pre-spiralled sector-shaped conductor formed in accordance with the invention.
Figure 5:
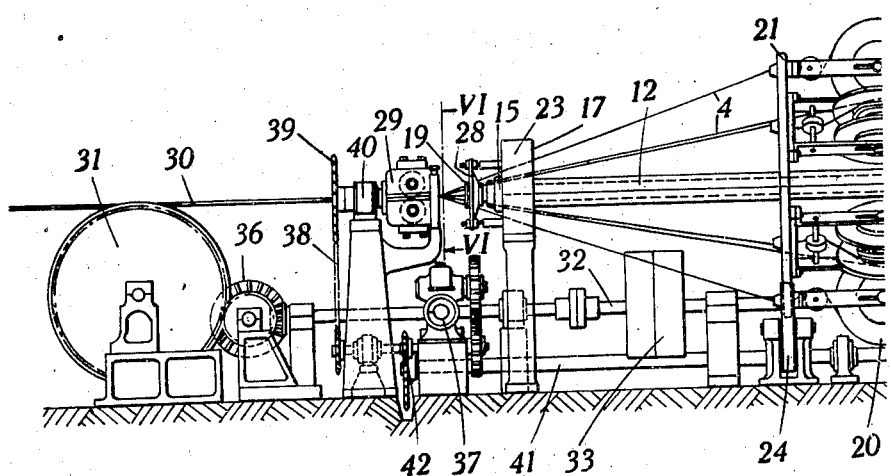

Figures 5 and 5a together illustrate a suitable form of machine for the production of the pre-spiralled conductor;

Figure 6 is a cross-sectional view, taken on the line VI—VI in Figure 5, showing the mutual disposition of the component parts of the sector-shaped conductor illustrated in Figure 1 just prior to their entry into the closing die of the machine;

Figure 7 is an external view of a short length of the finished pre-spiralled sector-shaped conductor; and Figure 8 represents a transverse section through a pre-spiralled sector-shaped conductor similar to that shown in Figure 1.

The most common forms of pre-spiralled conductors are a sector shape, as shown in Figure 1, with substantially rounded corners, and an oval shape as shown in Figure 3.

The central part of the strand is formed as a single wire or strip, or as a group of wires or strips, examples of which are shown in Figures 1, 3 and 8, depending mainly upon the cross-sectional size of this part. For the smaller cross-sections an undivided central part can be used, but for the larger cross-sections it may be necessary to divide this part into two, three, four or more portions. The deciding factor will generally be the necessity for sufficient flexibility to facilitate bending, both in the stranded conductor and in the complete cable, which is required in the processes of manufacture and installation. In the forms illustrated in the drawings the central part is in both cases divided into four portions.

Generally where the central part is built up from sections, it will be possible to make these sections of the same form. For instance, an oval central part such as the central part of the stranded conductor represented in Figure 3, may be built up from four similar sections 1. Where the sector shape is to be produced, this can be done by taking four sections comprising two pairs of different forms. Thus the central part of the sector-shaped conductor shown in Figure 1 consists of two members 2 of one shape and two other members 3 of another shape, symmetrically arranged. Alternatively the sector form such as is shown in Figure 1 may be obtained by arranging four similar sections, such as the members 4 indicated in broken lines in Figure 8, to produce an oval shape and subsequently deforming the assembled group from the oval to the sector shape shown in full line in Figure 8. The assembly of the central part of the stranded conductor may be performed by passing the sections through rollers in a machine which gives the required pre-spiralled lay to the central part. For this purpose the central part, or the sections from which it is formed, may be fed straight through a machine from supply reels and may be engaged in the machine by two or more rolls of appropriate form, the rolls (in addition to rotation about their own axes) being rotated about the axis of forward movement of the conductor through the machine at an appropriate rate, in relation to the forward movement, to apply the pre-spiralled lay.

The wires forming the outer part will generally be used in a single layer as is the case in both the examples shown in Figures 1, 3 and 8. In the finished strand these wires will have approximately the form of the stones of an arch, but since the curvature of the periphery of the section of the central part of the conductor varies from point to point, the sectional shape of the outer wires will also vary according to their individual positions around this periphery. Further, since the outer wires are applied to the central part with a lay which is much shorter than the pre-spiralled lay and in a sense which may, although not necessarily, be opposite to the sense of the pre-spiralling, the cross-sectional shape of each wire will vary as it progresses round the central part.

It will be seen that each of the outer layer of wires, when they are fitted closely together about the central part, will have substantially the form of a trapezoid conformed to the curvature of the surface of the central part, and, in order to arrive at this shape without very great deformation during assembly, the wires will be made initially in a form which is a close approach to the average shape attained in the final grouping.

Referring now more particularly to the examples illustrated in Figures 1 to 4, the wires 4 forming the outer layer in both instances are initially of trapezoidal section, that is to say, in the form of a four-sided figure with two parallel sides. In the case of the sector section shown in Figure 1, the outer wires 4 are initially of rectangular trapezoidal form (Figure 2), which, when applied to the central sector-shaped part, formed of four separate wires, with a right hand lay, as represented in Figure 7, shorter than the pre-spiralling lay, are deformed to fit compactly about the smooth surface of the centre part and to present themselves a smooth exterior. The oval section shown in Figure 3 having a symmetrical form permits the use of outer wires 4 of isosceles trapezoidal form (Figure 4) which conform to the oval central portion, formed of four similarly sectioned members 1, with a minimum of deformation. It will be appreciated that the cross-sectional form and area of the initial wires 4 and the number thereof may be chosen so as to facilitate their application to produce the desired stranded conductor with a minimum deformation.

The assembly of the outer wires 4 on the central part of the conductor is a stranding operation combined with a consolidating operation, and these two operations may be performed by one or more groups of rolls acting on the wires as they are being closed, or directly after they have been closed, on the central part. It may be convenient to effect the assembly of the central part of the stranded conductor at the same time as the combined stranding and consolidating operation for the outer wires, the one set of rolls being adapted to apply simultaneously the required pre-spiralled lay to the central part and to the complete conductor. In Figure 5 is illustrated a machine suitable for the construction in such a manner of a pre-spiralled stranded conductor in accordance with the invention.

Figure 2:
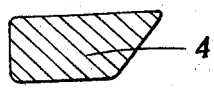
Figure 2 represents the original sectional shape of wires used to form the outer part of the conductor shown in Figure 1.

As shown, the machine is set up to manufacture a sector-shaped strand of thirteen wires and to give it a pre-spiralled form to render the completed and subsequently insulated strand suitable for laying up together with two other similar strands to make a three core cable. The strand thus manufactured consists of the four wires 2, 2, 3, 3, (Figure 1) forming the shaped core about which are stranded the nine rectangular trapezoidal wires 4 (Figure 2). Referring to Figure 5, the back plate 5 of the stranding machine is secured to the shaft 6 turning in the bearings 7 and 8. To provide the four inner wires of the strand four bobbins 9 are required, mounted on spindles secured to the back plate 5 and parallel to the axis thereof. The wires withdrawn from these bobbins are guided through a guide ring 10 to enter one of four tubes 11. These tubes 11, bunched together and secured by being welded at intervals, pass through the hollow mandrel 12 of the frame or cage 13 which is in axial alignment with the back plate and have fitted over their end parts and secured thereto at each end a sleeve member 14 running in ball bearings 15, one of which adjacent the back plate 5 is mounted on a pedestal 16, and the casing of the other, at the extreme front end, is secured to the runner head 17. The rearmost sleeve 14 is coupled to the frame 18 carrying the guide ring 10 and ensures that the nest of tubes 11 rotates within the hollow mandrel 12 at the speed of the back plate 5 and independently of the mandrel rotation. This effectively prevents any entanglement of the wires which might otherwise be produced during their passage through the mandrel 12. The forward sleeve 14 carries a die plate 19 through which the four wires are guided after passage through the tubes 11. The guiding apertures in this die plate 19 are of such form that the four wires 2, 2, 3, 3, are maintained in the required relative formation to permit them to engage ultimately in the sector form, their relative positions after passing through the die-plate and before entering the closing die being represented in Figure 6.

The nine outer wires 4 of the strand are withdrawn from bobbins 20 carried within the cage 13. This cage is of the usual type and comprises three discs 21 carried on a hollow mandrel 12 which is supported at the rear end in a bearing 22 and at the front end by a bearing 23 in which the runner head 17 turns. The cage is additionally supported by roller supports 24 upon which rest the discs 21. The cage is divided into two compartments, the forward one containing six, and the rear one containing three, symmetrically arranged bobbins. Each bobbin 20 is rotatably mounted on a spindle 25 in a frame 26 which is fixed to the cage so that, as the cage 13 rotates, the bobbins spindle 25 always remains tangential to its circular path about the axis of the hollow mandrel 12. In this manner it is ensured that each of the trapezoidal wires 4 being withdrawn from the bobbins 20 always presents the same side of its section to the inner core, as shown in Figure 6. The wire 4 leaving each bobbin is led over a guide pulley 27, through an aperture in the adjacent disc 21, through appropriate apertures in the runner head 17 and through a die plate 28 secured thereto. From this die plate the wires 4 converge to enter a closing die in the revolving head 29 in which they and the inner wires derived from the back plate 5 are assembled. The assembled wires pass therefrom between a pair of rolls whereby the outer wires are consolidated to fit closely together upon the central part to form the sector shape represented in Figure 1. The completed strand 30 is finally drawn off by means of tension applied to it by the draw-off capstan 31. The relative disposition of the component wires of the outer layer and central part of the strand, maintained by the die-plates 19 and 28, just prior to their entry to the revolving head 29 is represented by the section in Figure 6. In order to produce the required pre-spiralling of the conductor it is necessary to ensure that the back plate 5 and the revolving head 29 shall rotate together about the axis of the machine at a speed having a pre-determined relationship with the forward movement of the finished strand, which relationship is decided by the required length of lay of the pre-spiralled strand. The drive to the several rotating parts is obtained from a driving shaft 32 extending along one side of the machine and provided with belt pulleys 33. The cage 13 is driven from this shaft through suitable change gears 34 which engage a gear wheel 35 keyed on to the hollow mandrel 12. The speed of rotation of the cage is chosen so as to apply the outer layer of wires 4 with a length of lay which is shorter than the pre-spiralling lay, as indicated in Figure 7. The direction of stranding of these wires may be right or left-handed, the required direction of rotation of the cage being selected accordingly. The drawing-off capstan 31 is driven from the driving shaft 32 through a suitable reduction gearing 36 at the forward end of the machine. The revolving head 29 is driven through a reduction gear 37 and a chain drive 38 which engages a chain sprocket 39 affixed to the shaft which carries the revolving head 29 and which is rotatably mounted in a bearing 40. A lay shaft 41 extends parallel to the main driving shaft 32, and is driven by a chain drive 42 from the gear drive to the revolving head 29. From this lay shaft 41 the back plate 5 is driven by a chain drive 43, the gear ratio of the drive 42 to the shaft 41 and of the drive 43 to the back plate 5 being chosen so that the back plate and the rotating head 29 rotate synchronously in the same direction about the axis of the machine. By the improved form and method of construction described above it is possible to produce a stranded member of non-circular pre-spiralled form which has a close approximation to the same area of cross-section as a solid member of the same sectional outline. At the same time, this can be done without sacrificing the flexibility of the complete member and its ability to bend without producing either excessive stress or displacement of the wires or strips. It has the further advantage that owing to the comparatively small deformation which takes place during the assembly of the parts these are not hardened to a great extent.

What we claim as our invention is:—

1. A method of manufacture of a non-circular pre-spiralled stranded electric conductor having a central part and an outer part, consisting of forming of strip a member having a smoothly curved sectional outline corresponding with the non-circular shape of the finished conductor, pre-spiralling the member to form the central part, forming each of a number of wires with an initial cross-sectional shape which is that of a four-sided figure, stranding around the central part a layer of these wires and consolidating the wires to fit closely together upon the central part to form the outer part, the initial cross-sectional shape of each of the wires approximating to the average shape of the wires after consolidation.

2. A method of manufacture of a non-circular pre-spiralled stranded electric conductor having a central part and an outer part, consisting of forming of strip a member having a smoothly curved sectional outline corresponding with the non-circular shape of the finished conductor, pre-spiralling the member to form the central part, forming each of a number of wires with a cross-sectional shape which is that of a rectangular trapezoid, stranding around the central part a layer of these wires and consolidating the wires to fit closely together upon the central part to form the outer part.

3. A method of manufacture of a non-circular pre-spiralled stranded electric conductor having a central part and an outer part, consisting of forming of strip a member having a smoothly curved sectional outline corresponding with the non-circular shape of the finished conductor, pre-spiralling the member to form the central part, forming each of a number of wires with a cross-sectional shape which is that of an isosceles trapezoid, stranding around the central part a layer of these wires and consolidating the wires to fit closely together upon the central part to form the outer part.

PHILIP VASSAR HUNTER.
HARRY HILL.